US008349465B2

(12) United States Patent
Cherukuri

(10) Patent No.: US 8,349,465 B2
(45) Date of Patent: Jan. 8, 2013

(54) PAPER SUITABLE FOR COLD-SET AS WELL AS HEAT SET

(75) Inventor: Suresh B. Cherukuri, Wisconsin Rapids, WI (US)

(73) Assignee: Newpage Corporation, Miamisburg, OH (US)

( * ) Notice: Subject to any disclaimer, the term of this patent is extended or adjusted under 35 U.S.C. 154(b) by 25 days.

(21) Appl. No.: 12/794,260

(22) Filed: Jun. 4, 2010

(65) Prior Publication Data

US 2010/0310864 A1 Dec. 9, 2010

Related U.S. Application Data

(60) Provisional application No. 61/184,540, filed on Jun. 5, 2009.

(51) Int. Cl.
*B32B 23/04* (2006.01)

(52) U.S. Cl. ..... 428/532; 428/533; 428/534; 428/537.5; 428/32.31; 428/32.87

(58) Field of Classification Search .................. 428/533, 428/534, 537.5, 32.31, 32.87, 532; 427/411
See application file for complete search history.

(56) References Cited

U.S. PATENT DOCUMENTS

| | | | | |
|---|---|---|---|---|
| 5,106,710 | A | 4/1992 | Wang et al. | |
| 5,792,515 | A | 8/1998 | Blake et al. | |
| 6,197,155 | B1 | 3/2001 | Wurster et al. | |
| 6,391,155 | B1 | 5/2002 | Wurster et al. | |
| 6,413,370 | B1 | 7/2002 | Wurster et al. | |
| 6,689,717 | B2 * | 2/2004 | Fujimori | 503/227 |
| 6,899,921 | B2 | 5/2005 | Haenen et al. | |
| 7,101,437 | B2 | 9/2006 | Boutilier et al. | |
| 7,108,898 | B2 * | 9/2006 | Yoshinari | 428/32.77 |
| 7,315,718 | B2 | 1/2008 | Sisler et al. | |
| 7,691,231 | B2 | 4/2010 | Ono et al. | |
| 2002/0019311 | A1 | 2/2002 | Fujimori | |
| 2004/0046858 | A1 | 3/2004 | Yoshinari | |
| 2005/0220518 | A1 | 10/2005 | Priebe | |
| 2006/0257635 | A1 | 11/2006 | Nonomura et al. | |
| 2007/0240838 | A1 | 10/2007 | Koyamoto et al. | |
| 2008/0023163 | A1 | 1/2008 | Ishioka et al. | |
| 2009/0075065 | A1 | 3/2009 | Cherukuri et al. | |

FOREIGN PATENT DOCUMENTS

| | | | |
|---|---|---|---|
| EP | 0377983 | | 7/1997 |
| EP | 0785307 | * | 7/1997 |
| EP | 1467022 | | 10/2004 |
| WO | 03/093577 | | 11/2003 |

OTHER PUBLICATIONS

PCT, International Search Report and Written Opinion, International Application No. PCT/US2010/037421; 15 pages (Aug. 2, 2010).

* cited by examiner

*Primary Examiner* — Leszek Kiliman

(74) *Attorney, Agent, or Firm* — Thompson Hine L.L.P.

(57) ABSTRACT

A coated paper suitable for cold-set as well as heat-set printing applications and methods for producing the coated paper. In accordance with one aspect, the coated paper comprises a cellulosic substrate and a coating on at least one side of the substrate wherein the coating comprises a binder and a pigment such that the coated side exhibits surface characteristics such that the surface accepts cold-set inks.

20 Claims, 1 Drawing Sheet

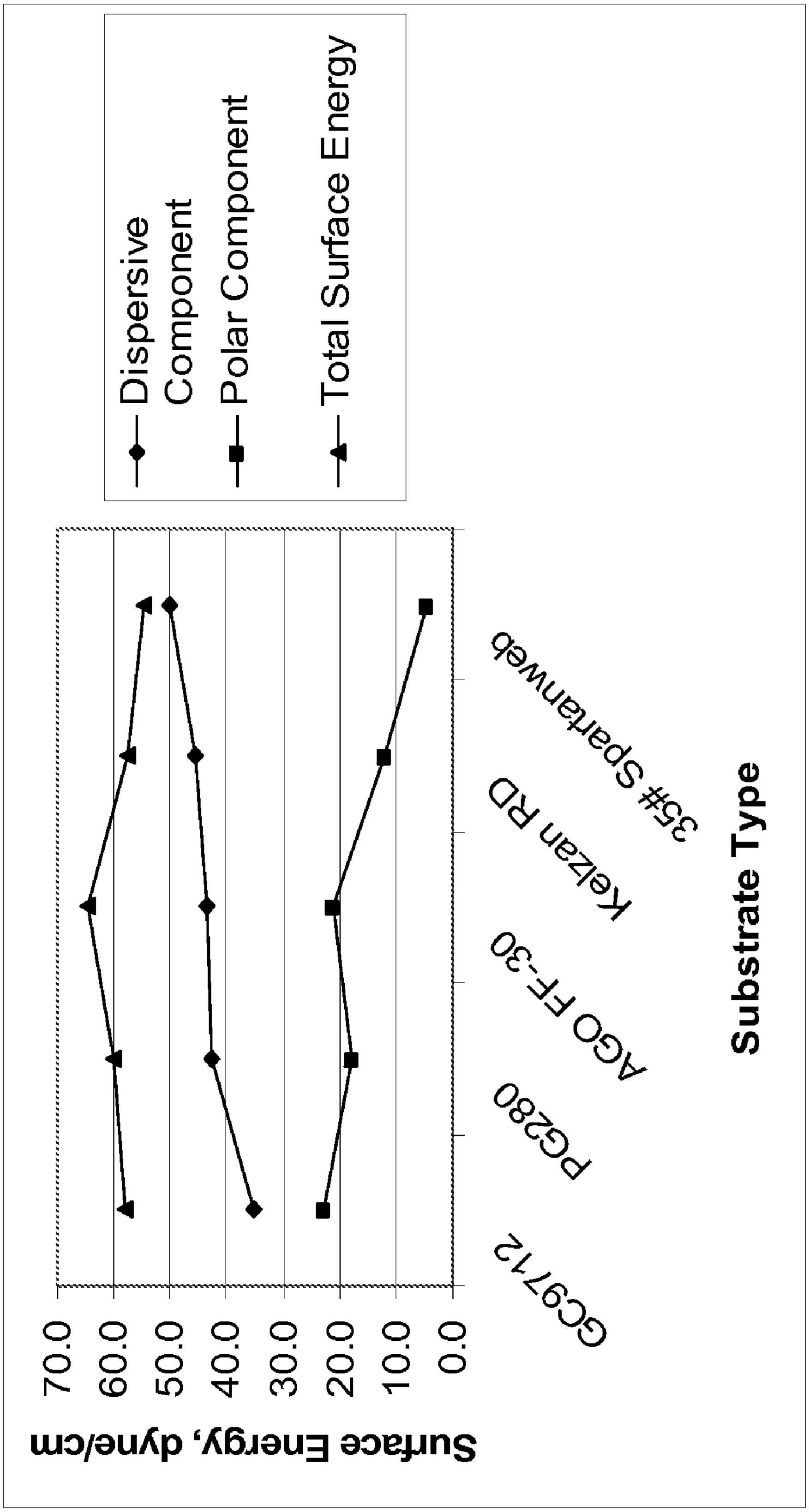
Surface energy of Paper Surface treated with various binders/additives
Surface Energy, dyne/cm
70.0
60.0
50.0
40.0
30.0
20.0
10.0
0.0
GC9712
PG280
AGO FF-30
Kelzan RD
35# Spartanweb
Substrate Type
Dispersive Component
Polar Component
Total Surface Energy

PAPER SUITABLE FOR COLD-SET AS WELL AS HEAT SET

CROSS REFERENCE TO RELATED APPLICATION

This application claims the benefit of U.S. Provisional Application Ser. No. 61/184,540 filed Jun. 5, 2009, the entire contents of which are hereby incorporated by reference.

BACKGROUND

The present application describes a coated printing paper suitable for heat-set printing applications as well as cold-set printing applications. Methods for producing the paper are also disclosed.

The cold-set process is predominantly used for the printing of newspapers on uncoated newsprint paper, and the printing processes used are therefore commonly referred to as newsprint printing presses. The heat-set process, on the other hand, covers an entirely different field of application and is, similar to the rotogravure process, predominately used for high-quality multi-color printing applications on coated, high-finish supercalendered papers up to the highest grades.

Papers used for cold-set printing are typically uncoated and have a high receptivity for liquids due to the absence of a paper coating. This is why it has been possible to use a printing ink which is absorbed quickly and therefore dries quickly, so that no additional energy in the form of heat or other radiation energy is necessary to assist drying of the printed ink.

Typically, paper made for heat-set printing applications would not perform well in cold-set printing mainly for two reasons. Either the paper does not accept the cold-set ink causing ink piling on blankets or it does not dry after printing causing offsetting. The problem becomes even more acute with paper surfaces coated with clay or carbonate based coatings.

SUMMARY

The present application describes a coating formulation that accepts cold-set ink readily and dries easily after printing. The described coating recipe also performs well in heat-set printing using SC (supercalendered paper) or newsprint inks (tack<8).

The present application relates to a coated paper suitable for cold-set as well as heat-set printing applications. In accordance with one aspect of the present application, the coated paper comprises a cellulosic substrate and a coating on at least one side of the substrate wherein the coating comprises a binder and a pigment such that the coated side exhibits surface characteristics such that the surface accepts cold-set inks. In accordance with certain aspects, the coated paper surface has a polar surface energy of less than about 25 dyne/cm, and in accordance with other aspects of the present application, the coated paper surface has a dispersive surface energy above 30 dyne/cm.

In accordance with certain aspects of the present application, the coating used to produce the coated paper includes a combination of binders and pigments that provide the desired low polar and high dispersive surface energies for the surface of the coated sheet. In accordance with certain embodiments, binders typically used in heat-set printing papers that have high polar surface energy components are combined with various cobinders that have a higher dispersive surface energy component such that the overall coated sheet exhibits low polar and high dispersive surface energies such that the coated sheet is suitable for accepting cold-set inks. In accordance with a specific embodiment of the present application, the coating composition comprises a latex binder, starch, and a cobinder such as CMC.

The present application also describes a method of producing a coated paper comprising the steps of coating a cellulose substrate with an aqueous coating composition comprising pigment and a binder to produce a coated paper, wherein the coated paper exhibits a polar surface energy of less than 25 dyne/cm and a dispersive surface energy of more than 30 dyne/cm. The resulting coated paper is suitable for cold-set as well as heat-set printing applications. The high dispersive surface energies and low polar surface energies allow the coated paper to accept cold-set inks without smearing.

In accordance with yet another aspect of the present application, a method of printing is disclosed wherein the method comprises providing a coated paper comprising a cellulosic substrate and a coating on at least one side of the substrate wherein the coating comprises a binder and a pigment wherein the coated paper has a polar surface energy of less than 25 dyne/cm on at least one side and applying a cold-set ink to the coated paper surface to produce a printed coated paper.

BRIEF DESCRIPTION OF THE DRAWING

The FIGURE illustrates the dispersive and polar components as well as the total surface energy for paper surfaces treated with various binders/additives.

DETAILED DESCRIPTION

The present application relates to a coated paper suitable for cold-set as well as heat-set printing applications and methods for producing the coated papers.

Applicant has found that surfaces with low polar and high dispersive surface energies accept cold-set inks (See Table 1 and the FIGURE). Various paper surfaces were tested using PGX Measuring Head from Fibro Systems AB using water and Diidomethane as mediums to make contact angle and surface energy measurements.

TABLE 1

Surface energy (dyne/cm) of Paper Surface treated with various binders/additives:

| Sample | Total Surface Energy | Dispersive Component | Polar Component |
|---|---|---|---|
| GC9712 | 57.9 | 35.3 | 22.6 |
| PG280 | 60.2 | 42.5 | 17.7 |
| AGO FF-30 | 64.5 | 43.3 | 21.3 |
| Kelzan RD | 57.5 | 45.6 | 11.9 |
| 35# Spartanweb | 54.6 | 50.0 | 4.6 |

In accordance with certain aspects, the polar surface energy of the coated paper for cold and heat set applications should be maintained under 25 dyne/cm, more particularly under 15 dyne/cm, more particularly under 10 dyne/cm and in certain cases under 5 dyne/cm, and dispersive surface energy should be above 30, more particularly above 35 dyne/cm, more particularly above 40 dyne/cm and in certain cases above 45 dyne/cm. It was also determined that binders such as starch and carboxy methyl starch have better affinity towards cold-set inks than latex. Although Xanthan gum showed even better affinity, it is not a binder. However, Xanthan gum could be used as functional additive to improve cold-set ink receptivity.

While GC 9712, which is styrene butadiene acrylonitrile latex available from Omnova Solutions, Inc., offers better binding strength in heat-set offset printing, at high concentrations, it can render the surface non-receptive to cold-set inks containing mineral oils as these latexes were designed to accept water faster by increasing polar surface energy. However, latexes could potentially be made more hydrophobic to make them suitable for cold-set printing.

The other three binders in Table 1 are PG 280, an ethylated starch binder; Finnfix-30 (FF30), a carboxy methyl cellulose; and Kelzan RD, a xanthan gum based thickener. These products seem to provide better cold-set ink receptivity than latex due to their higher level of dispersive surface energy (>40 dyne/cm). When the binder composition is adjusted according to certain aspects of the invention, the blankets on the cold-set press may have zero ink piling due to an even split between the paper surface and the blanket surface.

The ink absorptivity can be measured using cold-set ink smear test which involves applying cold-set ink on the paper surface and wiping it instantly to measure the brightness values on the treated surface before and after the test. The samples with best receptivity typically have values in the range 6 to 15% of holdout (higher percentages indicate lower ink receptivity).

The ink absorbency after printing is another indicator of cold-set printing driven by both binder ratios and pigment ratios.

Pigment: In accordance with a particular formulation, the pigment blend comprises 90 parts of high-bright delaminated clay and 10 parts of calcined clay but other pigments such as precipitate and ground calcium carbonate, titanium dioxide and others used in the coated paper industry can also be used. Of course, other ratios of clays could also be used. For example, 60 to 100, more particularly 80 to 95 parts delaminated clay can be used and 0 to 40, more particularly 5 to 20 parts calcined clay can be used. An example of a suitable delaminated clay is Kaolux-HS, which is an engineered delaminated clay, with a mean particle size of approximately 4 microns (as measured by laser scattering particle size analyzer Model: LA-910). An example of a suitable calcined clay is Kaocal-50. Depending on the brightness target, $TiO_2$ and other brightening pigments such as barium sulfate and Aluminum Tri Hydrate (ATH) could be used. Addition of calcined clay improves porosity of the coating and thus enhances the ink drying capability under cold-set printing conditions. The level could be as low as zero under alkaline conditions and as high as 20 parts under acid papermaking conditions.

Under alkaline papermaking conditions, the pigment blend could contain ground or calcium carbonate pigments either in combination with clay or as sole pigment. These pigments typically offer more open coating structure thus reducing the level of calcined clay needed to as low as zero.

Binders: Choice of binders is one of the key factors in providing a coated sheet in accordance with the present application. Not all binders can readily accept cold-set inks Binders that may be useful in the present application include, but are not limited to, binders based on styrene acrylic copolymers, styrene butadiene copolymers, styrene-butadiene-acrylonitrile latex, ethylene vinyl acetate, and polyvinyl acetate. Typically, latex binders in heat-set printing papers are designed to have high polar surface energy component to accept the fountain solution readily. However, this property can be detrimental to cold-set ink receptivity due to vegetable and mineral oils present in cold-set inks Latex binders with high polar surface energy can still be used in accordance with the present application but will typically be used at lower addition levels compared to those levels used for conventional paper intended for heat set printing. It is also possible to use an optimally designed latex (for surface energy) at higher addition levels.

To determine the ink receptivity of various binders, pure binders (without any pigment or additives) were applied to base paper and the cold-set ink receptivity was measured by a cold-set ink receptivity test.

Cold-Set Ink Receptivity Test: The cold set ink receptivity test is based on a modified Croda ink test. The test is conducted using a cold-set publication ink supplied by Sun Chemicals (ID: 2154-174-4). Deep discoloration indicates a high rate of absorption while light discoloration indicates low absorption. The brightness of the coated paper as described herein is tested and cold-set ink is applied to the sheet using a spatula and wiped off immediately to simulate the short contact time between the paper and the inking blanket. The ink receptivity is calculated using the following equation $$\text{Cold-Set Ink Receptivity (\%)} = \frac{\begin{matrix}\textit{TAPPI}\text{ Brightness of}\\ \text{Smeared Paper}\end{matrix}}{\begin{matrix}\textit{TAPPI}\text{ Brightness of}\\ \text{Unsmeared Paper}\end{matrix}} \times 100$$

Calculation Example:

$$\text{Cold-Set Ink Receptivity (\%)} = \frac{8.5}{71.5} \times 100 = 11.9\%$$

Papers with high ink receptivity appear darker (lower brightness due to lower holdout and hence lower percentage). The following table compares some of the widely used binders or co-binders.

TABLE 2

| Binder Type | Ink Receptivity |
|---|---|
| Blank (no binder) | 9.3% |
| Latex (Gencryl 9712) | 35.0% |
| CMC (FF-30) | 17.2% |
| Starch (PG-280) | 24.0 |
| Xanthan Gum (Kelzan RD) | 12.3% |

The ability to accept the ink was related to the surface energies induced by each of these products as shown in Table 1.

Latex: This particular product is designed to perform well in heat-set application but can interfere with cold-set ink receptivity. However, latexes could be synthesized to balance the dispersive and polar surface energies required to minimize the negative impact on cold-set receptivity. In accordance with the example presented in Table 2, the level of addition was lowered to 3 parts from the 8 parts used in a control heat set printable sheet. However, a highly optimized latex having the appropriate balance of surface energies could be used at up to 10 parts. Gencryl 9712 is an example of a latex binder that can be used in accordance with the present application. Other latex binders typically used in paper coatings may also be used. Latex binders typically are present in an amount of from about 1-10 parts, more particularly 2-6 parts based on 100 parts pigment (by weight).

Starch is a natural and inexpensive binder that is widely used in paper coatings. Typical starches include pre-converted (such as hydroxyl-ethylated) starches and pearl starches that are modified using thermal, chemical and enzymatic treatments. While starch accepts cold-set better than latex, it is strong film former. Large amounts of film formers can interfere with drying of the cold-set ink without heat. Starch binders, when included in the coating formulation, typically are present in an amount of from about 1-10 parts, more particularly 3-7 parts based on 100 parts pigment (by weight).

Co-binders: Other co-binders can also be included in the coating formulation to modify the coating properties. CMC is an example of a co-binder that offers not only strength but also viscosity and water holding properties to the coating. CMC is generally considered equal to latex in providing pick strength properties and by using CMC or another co-binder, the need for latex is minimized. Examples of other co-binders include, but are not limited to, soy protein, synthetic protein, poly vinyl alcohol, and carboxy methyl starch. Co binders, when included in the coating formulation, typically are present in an amount of from about 0.5-4 parts, more particularly 1-3 parts based on 100 parts pigment (by weight).

Insolubilizer: Sequarez 755 is a starch insolubilizer which prevents starch from dissociating when it comes in contact with water. Due to high level of starch used in accordance with certain formulations (relative to latex), use of an insolubilizer can result in an improved coating with respect to the product being suitable for both heat-set and cold-set printing processes. This product is included in the coating based on the percentage of starch (based on dry weight) in amounts typically from about 2-8%, more particularly from about 4-6%.

Functional Additives: Other additives such as lubricants and optical brighteners can also be used in the formulation in amounts that can be readily determined by one of ordinary skill in the art to provide the desired effects of the additive.

Substrate: An example of a base paper that can be used in accordance with the present application contains approximately 60% high-bright mechanical pulp (combination of thermo-mechanical and stone-ground wood) and 40% bleached softwood Kraft pulp. However, the ratios can be changed so that either 100% mechanical pulp or 100% bleached softwood pulp could be used to meet the brightness target of the finished paper. The furnish composition is expected to have minimal impact on the performance of the paper in terms of cold-set ink receptivity and heat-set printability.

Application of Coating: In accordance with particular aspects, the coating described herein can be applied with a short-dwell type coater which enables application of coating recipes at lower percent solids to achieve lower coat weights of 1.5# to 3#/ream. Other coating applicators such as Jet Flow or pre-metered size presses could also be used to achieve similar coat weights. Applicator roll coaters (also known as dip-roll applicators) can also be used but are not preferred as they tend to force the coating through the base paper thus sealing the sheet and preventing ink from drying easily.

Supercalendering: Supercalendering should typically be avoided. Supercalendering the sheet densifies the coating and may prevent cold-set ink from drying thus causing smearing of ink. Due to this, the smoothness of the sheet typically is maintained at a higher level. For example, in accordance with some aspects, the smoothness may be in the range of 5.0-6.0 microns (PPS measured at 5 KG pressure using soft backing).

The following non-limiting example performs well in both heat-set and cold-set printing (Table 3).

TABLE 3

Coating Recipe Suitable for Heat-Set and Cold-Set Printing

| | Control (Not suitable for Cold-Set) Only Heat-Set | Suitable for both Cold-Set and Heat-Set |
|---|---|---|
| Delaminated Clay (Kaolux HS) | 90 | 90 |
| Calcined Clay (Kaocal-50) | 10 | 10 |
| Latex (GC 9712) | 8 | 3 |
| Starch | 0 | 5 |
| Enzyme Converted (FF-30) (Carboxy Methyl Cellulose) | 0.4 | 2 |
| Insolubilizer (Sequarez 755 ®) | 0 | 0.25 |

On a 100 parts pigment basis, the binder(s) may be present in an amount of from about 2-30 parts, more particularly from about 4 to 20 and in certain cases from about 5 to 15 parts. Of course, other ranges outside these may be acceptable depending on the binder or binders being used.

The coat weight and amount of starch influence the drying rate of cold-set inks after printing. To minimize the offsetting problems, starch level should be maintained in the range of 6-10 parts and coat weight in the range of about 1.5# to 3#/ream (ream=3,300 $ft^2$) per side, more particularly between about 2# to 2.5#. The coating can be applied using either short-dwell, applicator roll or fountain jet applicators. The coating can be applied using either on-machine or off-machine coater. Papers that can be used herein are not particularly limited but typically papers will have basis weights ranging from about 30# to 50#/ream.

The present application describes a coated paper suitable for heat-set printing applications as well as cold-set printing applications. The coating contains a combination of pigments and binder as well as other optional components that provide the necessary balance of properties to allow printing in accordance with either type of application. The binder and pigments are selected so as to provide a coated surface having a relatively low polar surface energy and a correspondingly higher dispersive surface energy. In accordance with certain embodiments of the present invention, the coated paper has a polar surface energy of less than 10 dyne/cm and a dispersive surface energy above 40 dyne/cm.

The coating composition can be applied to a wide variety of substrates. The specific composition of the substrate is not particularly important. In accordance with certain aspects of the present invention, the base stock used in forming the substrate may be a cellulosic base stock. The base stock may contain chemical pulps (e.g., bleached or unbleached softwood or hardwood kraft pulps, etc.); mechanical pulps (e.g., groundwood pulp, thermo-mechanical pulp, semi-chemical pulp, recycled mechanical pulps, etc.) and deinked pulps (e.g., recovered paper pulps). These various pulps can be used alone or in any combination.

Having described the invention in detail and by reference to disclosed embodiments thereof, it will be apparent that modifications and variations are possible without departing from the scope of the invention as defined in the following claims:

What is claimed is:

1. A coated paper comprising:

a cellulosic substrate; and a coating on at least one side of said substrate wherein said coating comprises a binder and pigment;

wherein the coated paper has a dispersive surface energy above 30 dyne/cm and has a polar surface energy of less than 25 dyne/cm on at least one side.

2. The coated paper of claim 1 wherein the coated paper has a dispersive surface energy above 30 dyne/cm.

3. The coated paper of claim 1 wherein said coated paper provides acceptable print quality when printed using a heat-set printing application and when using a cold-set printing application.

4. The coated paper of claim 1 wherein the coating comprises 6 to 10 parts by weight starch based on 100 parts pigment.

5. The coated paper of claim 1 wherein the coating comprises a latex binder, a starch binder, and carboxymethylcellulose.

6. The coated paper of claim 5 wherein the coating comprises from 1 to 10 parts latex binder, 1 to 10 parts starch binder, and 0.5 to 4 parts carboxymethylcellulose based on 100 parts pigment.

7. The coated paper of claim 1 wherein the coating comprises an insolubilizer.

8. The coated paper of claim 7 wherein the insolubilizer is present at an amount of about 2 to 8% based on the amount of starch in the coating.

9. The coated paper of claim 5 comprising an insolubilizer present in an amount of about 2 to 8% based on the amount of starch.

10. The coated paper of claim 1 wherein the pigment comprises a combination of delaminated clay and calcined clay.

11. The coated paper of claim 1 wherein the coat weight of the coating is about 1.5 lbs. to 3 lbs./ream (3,300 $ft.^2$) on a dry basis per side.

12. The coated paper of claim 1 wherein the coated paper has a polar surface energy of less than 15 dyne/cm.

13. A method of producing a coated paper comprising the steps of:

coating a cellulose substrate with an aqueous coating composition comprising pigment and binder; and drying the coating to produce a coated paper wherein the coated paper exhibits a polar surface energy of less than 25 dyne/cm and a dispersive surface energy of more than 30 dyne/cm.

14. The method of claim 13 wherein the coating coat weight is about 1.5 lbs. to 3 lbs./ream (3,300 $ft.^2$) on a dry basis per side.

15. The method of claim 13 wherein the coating comprises a latex binder, a starch binder, and carboxymethylcellulose.

16. The method of claim 15 wherein the coating comprises from 1 to 10 parts latex binder, 1 to 10 parts starch binder, and 0.5 to 4 parts carboxymethylcellulose based on 100 parts pigment.

17. The method of claim 16 wherein the coating comprises an insolubilizer.

18. The method of claim 17 wherein the insolubilizer is present at an amount of about 2 to 8% based on the amount of starch in the coating.

19. The method of claim 13 wherein the step of coating a cellulose substrate with an aqueous coating composition comprises coating with a short dwell type coater.

20. The coated paper of claim 9 wherein the coated paper has a dispersive surface energy above 30 dyne/cm.

* * * * *

UNITED STATES PATENT AND TRADEMARK OFFICE

CERTIFICATE OF CORRECTION

PATENT NO. : 8,349,465 B2
APPLICATION NO. : 12/794260
DATED : January 8, 2013
INVENTOR(S) : Suresh B. Cherukuri It is certified that error appears in the above-identified patent and that said Letters Patent is hereby corrected as shown below:

On the face of the patent:

Section (73) Assignee, currently reads: Newpage Corporation, it should read -- NewPage Corporation --

Signed and Sealed this
Twenty-sixth Day of February, 2013

Teresa Stanek Rea
*Acting Director of the United States Patent and Trademark Office*